May 7, 1935.  E. N. SNODGRASS ET AL  2,000,301

PROGRESSIVE CONTAINER

Filed April 2, 1932

INVENTORS
EDWARD N. SNODGRASS.
MITCHEL E. HOLY

ATTORNEY

Patented May 7, 1935

2,000,301

UNITED STATES PATENT OFFICE 2,000,301

PROGRESSIVE CONTAINER

Edward Norman Snodgrass, Denver, Colo., and Mitchel E. Holy, Chicago, Ill., assignors to Norman Confections, Inc., Denver, Colo., a corporation of Colorado Application April 2, 1932, Serial No. 602,712

8 Claims. (Cl. 206—56)

This invention relates to containers and more particularly to collapsible containers for the confinement of edibles, although certain features thereof may be employed with equal advantage for other purposes.

It contemplates more especially a collapsible container which progressively serves as an envelope for any suitable edible such as an ice cream confection, thereby enabling the consumption thereof without resort to a dish, fork or other commonly employed eating implement.

Confections and refrigerated edibles are becoming increasingly popular, but an objectionable feature is the required handling during the consumption thereof to the end that the accidental lodgement thereof on the individual's garment proves most annoying. This is especially true with confections which attempt to confine various forms of fillers and other syrupy contents which are incapable of retention without undue care and attentive handling. Moreover, such must be consumed by resort to forks, dishes, spoons, and other utensils, and for that reason ice cream confections have ordinarily been served plain or with dry and rigid fillers.

With the teachings of the instant invention, the objectionable features of consuming the customary unstable confection are entirely overcome, and improved ice cream edibles and confections are capable of preparation, distribution and hand consumption with enhanced taste and facility without resort to dishes, forks or other commonly employed eating implements. Moreover, most any type of confection filler may be employed with liquid or syrupy taste imparting ingredients such as fruit and chocolate syrups to the end that novel ice cream sundaes may be served over the counter in a very tasty and improved manner without subjecting the individual to any possible embarrassment or inconvenience through the soiling of garments by the accidental lodgement of liquid or viscous fillers.

One object of the present invention is to provide a new and novel carton for confining, handling and consuming normally unstable confections.

Another object is to provide a progressive carton for edible confections possessing improved taste and consuming characteristics therewith.

Another object is to provide a carton having a progressively removable liner for enabling the gradual consumption of normally unstable edibles from the fingers without resort to spoons, dishes, forks or other utensils.

Still another object is to provide a carton having a collapsible liner which is reversely foldable to progressively expose the contents for gradual consumption from the fingers.

A further object is the provision of a carton having a progressively removable lining which gradually exposes the contents for consumption and thence is collapsible to expose any residue thereof.

A still further object is to provide an improved container which enables a normally unstable confection to be prepared, handled, distributed and consumed in connection therewith.

Still a further object is the provision of a carton having a collapsible liner serving as an envelope for normally unstable contents to enable the progressive exposure thereof for consumption from the fingers without resort to dishes, forks or other commonly employed eating implements.

In the drawing:

Figure 1 is a development of the blank for the liner of the container embodying features of the present invention.

Figure 2 is a cross section of the container and liner in assembled relation, the liner being progressively displaced from the container casing for substantially its entire distance in order to clarify the showing.

Figure 3 is a perspective view of the container casing embodying features of the present invention.

Figure 4 is a perspective view of the container and its liner removed partially therefrom, parts of the container casing being broken to clarify the showing.

Figure 5 is a perspective view of the liner after it has been completely removed from the container casing to completely expose the contents for complete consumption.

The structure selected for illustration comprises a container casing 10 which is stamped or otherwise shaped from sheet material such as cardboard of substantially rectangular configuration to present parallel walls 11—12 and 13—14. The walls 11—12 and 13—14 are defined by providing uniformly spaced score lines 15 in parallelism transversely of the blank 10 to serve as corners therefor. The wall 12 is provided with a flap 16 connected therewith through the medium of the score line 15 adjacent thereto for overlapped application to the interior surface of the wall 14. In consequence thereof, the blank 10 may be assembled into a casing having a substantially rectangular cross section by effecting adherence of the flap 16 to the interior surface of the wall 14.

It is to be noted that one end of the casing 10 is open while the other end thereof has an adjustable closure defined by exposing flaps 17 and 18 joined by score lines 19 to the walls 13 and 14, respectively. The flaps 17 and 18 are capable of being folded in overlapping relation to close the other end of the container 10. The flaps 17 and 18 are maintained in their folded position to serve as a closure by means of transversely disposed flaps 20 and 21 joined to the walls 11 and 12, respectively, by means of score lines 22 to enable the folding overlapped application thereof with respect to the flaps 17 and 18. In order to retain the flaps 17, 18, 20 and 21 in transverse overlapped relation, the flaps 20 and 21 are provided with inter-engaging means, in this instance a tongue 23 and slit 24, respectively. The tongue 23 is complemental to the slit 24 which is sized for the connected reception thereof, thereby closing the container 10 at one end and maintaining such substantially rigid to possess, in this instance, a substantially rectangular cross section. It is to be noted that with the disengagement of the tongue 23 from the slit 24, the casing 10 may be collapsed into a flat double sheet.

In order to confine edibles such as an ice cream block for progressive consumption, a liner 25 is stamped or otherwise shaped from sheet material corresponding to the casing 10. In this instance, a liner comprises segregated walls 26, 27, 28 and 29 conforming substantially in area and configuration to the walls 11—12 and 13—14 of the casing 10. The liner walls 26 and 27 are connected to each other through the medium of a flap 30 joined thereto by means of parallel crease or score lines 31 and 32, respectively. It is to be noted that the flap 30 serves as the bottom of the liner 25 and conforms substantially in area and configuration to the interior cross section of the casing 10.

In order to envelope and progressively expose an edible such as an ice cream block 33, the liners 26 and 27 are segregated from each other for substantially their entire longitudinal extent, but for assembly purposes are connected through the medium of the bottom 30 along the crease lines 31 and 32. Then, too, opposing walls 28 and 29 are connected to one or the other of the liner walls 26 and 27 for assembly purposes. In the present embodiment, the liner walls 28 and 29 are connected to the liner wall 27 proximate to the lower region thereof defined by score lines 34 and 35. In consequence thereof, the walls 26 and 27 may be folded for erect disposition in vertical parallelism along the score lines 31 and 32, and the liner walls 28 and 29 interposed therebetween to serve as a complement thereto for complete enclosure on four sides by folding along the score lines 34 and 35 in a lateral direction. Thus, the liner walls 26, 27, 28 and 29 will define a complete liner for the carton casing 10 and fully enclose the edible content 33.

To better enclose the lower region proximate to the bottom 30, flap extensions 36 and 37 are formed thereon for connection thereto by means of the score lines 38 and 39, respectively, in alignment with the edges of the liner walls 26 and 27. Then, too, the fold areas defined by the score lines 34 and 35 and extending from walls 28 and 29 are so formed and constitute a fragmentary part defined by the cut inclined edge 40 thereof to permit the remaining portions 41 thereof to constitute an attachment to the wall 26 for connection thereto by score lines 42. With this arrangement, the walls 26 and 27 are disposed in an erect position for folding along the score lines 41 and 42, and thereupon the lateral walls 28 and 29 are transversely folded along score lines 34 and 35 to bring the complemental fold areas 40 and 41 in alignment. The bottom flaps 36 and 37 are thereupon folded upwardly to embrace the complemental fold areas 40 and 41 so as to afford the telescopic disposition of the assembled liner within the casing 10. The liner 25 may be telescoped therein for its complete extent through the open end thereof, and the top closure therefor is formed by the extensions on the liner walls 26, 27, 28 and 29. To this end, the liner walls 28 and 29 are provided with flaps 42 and 43, respectively, and joined thereto by means of score lines 44. This enables the overlapping application of the flaps 42 and 43, and similarly to the flaps 20 and 21 of the carton casing 10, the walls 26 and 27 are provided with flap extensions 45 and 46, respectively.

The flap 45 is formed with a tongue 47 complemental to a slit 48 formed in the flap 46, and these may be engaged responsive to the overlapping application of the flaps 45 and 46 to serve as a permanent connected closure with the liner 25 serving as a complete and self-sustaining envelope for the ice cream block 33. It is to be noted that the liner 25 when assembled to completely envelope the ice cream block 30, may be telescoped completely within the carton casing 10, and progressively displaced or removed therefrom for gradual consumption of the contents by disengaging the flaps 45 and 46 and reversely folding the walls 26, 27, 28 and 29 over the carton casing 10 exterior of the walls thereof in a manner similar to the peeling of a banana. This progressively exposes the ice cream block 33 for consumption from the hands which embrace the carton casing 10 so that the normally unstable confection may be distributed and consumed without resort to any implements such as dishes, spoons, forks and other utensils customarily employed for that purpose.

In order to expedite and render the reverse folding of the liner walls more convenient, the walls 26, 27, 28 and 29 are provided with a plurality of longitudinally spaced crease or light score lines which are disposed transversely thereof in parallelism. The score lines 49 are in alignment on all of the liner walls 26, 27, 28 and 29 to enable the progressive folding thereof as the ice cream block 33 is consumed. With the complete removal of the liner 25 from the carton casing 10, the residue of the ice cream block 33 is completely exposed by collapsing the walls 26, 27, 28 and 29 in a manner shown in Figure 5; consequently, there is no necessity for waste or inconvenient consumption of even the minutest portion of the normally unstable confection that is confined within the liner 25. It is manifest that with normally unstable confections such as ice cream, a container herein described proves very advantageous for the commercial distribution and ready consumption thereof from the fingers.

Then, too, ice cream confections such as ice cream blocks may be produced with a liquid or viscous filler such as fruit syrups in a manner described more fully in the co-pending application serially numbered 588,132 and filed January 22, 1932. Even with a liquid filler or a core, the normally unstable confection 33 may be consumed from the fingers without resort to spoons, forks, dishes or other utensils and accidental drip or lodgment of the constituents is not nearly so prevalent as with known methods or devices for consuming ordinary ice cream sundaes and similar confections.

Various change may be made in the embodiment of the invention herein specifically described without departing from or sacrificing any of the advantages of the invention as defined in the appended claims.

We claim:

1. In a container of the character described, the combination with a tubular member open at an end to serve as a casing, of a collapsible casing liner comprising a plurality of walls, a flap conforming substantially in configuration with the cross-sectional interior of said tubular member to serve as the liner bottom for telescopic association with said casing through an open end thereof, one of said walls being in creased connection with an edge of said liner bottom for extension therefrom, another of said walls being in creased connection with the opposite edge of said liner bottom for confronting extension therefrom, another of said walls extending in a lateral direction from each side edge of said last named wall in creased connection therewith, confronting overlapping extensions in creased connection with said walls, inter-engaging means formed on certain of said wall extensions to serve as the top closure of said liner, and flaps in creased connection with the lateral edges of said liner bottom for extension therefrom for enabling the complete folded association between said walls and bottom to completely confine contents therein, said liner being displaceable from said tubular member to expose the liner contents.

2. In a container of the character described, the combination with a tubular member open at an end to serve as a casing, of a collapsible casing liner comprising a plurality of walls, a flap conforming substantially in configuration with the cross-sectional interior of said tubular member to serve as the liner bottom for telescopic association with said casing through an open end thereof, confronting extensions on opposing walls, inter-engaging means on certain of said extensions to serve as the top closure of said liner, fold lines connecting a pair of opposing walls to said flap, and fold lines connecting the remaining walls to one of said opposing liner walls for folded association relative to said liner bottom to completely confine contents therein, said tubular member serving to maintain said liner in rigid folded relation when telescopically received therein.

3. In a container of the character described, the combination with a tubular member open at an end to serve as a casing, of a collapsible casing liner comprising a plurality of walls, a flap conforming substantially in configuration with the cross-sectional interior of said tubular member to serve as the liner bottom for telescopic association with said casing through an open end thereof, confronting extensions on opposing walls, inter-engaging means on certain of said extensions to serve as the top closure of said liner, fold lines connecting a pair of opposing walls to said flap, and fold lines connecting the remaining walls to one of said opposing liner walls, said tubular member serving to maintain said liner in rigid folded relation to completely confine contents therein, said remaining walls being partially slitted along its crease line connection with said last mentioned opposing wall to progressively expose the liner contents when displaced from said tubular member.

4. In a container of the character described, the combination with a tubular member open at an end to serve as a casing, of a collapsible casing liner comprising segregated walls, a flaping liner comprising segregated walls, a flap conforming substantially in configuration with the interior of said tubular member to serve as the liner bottom for telescopic association with said casing through an open end thereof, confronting extensions on certain opposing walls to serve as the top closure of said liner, fold areas connecting a pair of opposing walls to said bottom flap, and fold areas connecting the remaining walls to one of said opposing liner walls, said last named fold areas having a complement thereof formed on the other of said opposing liner walls.

5. In a container of the character described, the combination with a tubular casing, of a collapsible casing liner comprising segregated walls, a flap conforming substantially in configuration with the interior of said tubular member to serve as the liner bottom for telescopic association with said casing confronting extensions on certain opposing walls to serve as the top closure of said liner, fold areas connecting a pair of opposing walls to said bottom flap, and fold areas connecting the remaining walls to one of said opposing liner walls, said last named fold areas having a complement thereof formed on the other of said opposing liner walls.

6. In a container of the character described, the combination with a tubular member open at an end to serve as a casing, of a collapsible casing liner comprising a plurality of walls, a flap conforming substantially in configuration with the cross-sectional interior of said tubular member to serve as the liner bottom for telescopic association with said casing through an open end thereof, confronting extensions on opposing walls, inter-engaging means on certain of said extensions to serve as the top closure of said liner, fold lines connecting a pair of opposing walls to said flap, fold lines connecting the remaining walls to one of said opposing liner walls, said tubular member serving to maintain said liner in rigid folded relation to completely confine contents therein, said remaining walls being partially slitted along its crease line connection with said last mentioned opposing wall, and a plurality of longitudinally spaced score lines along said liner walls for reverse folding thereof when displaced from said tubular member to progressively expose the liner contents when displaced from said tubular member.

7. In a container of the character described, the combination with a tubular member open at an end to serve as a casing, of a collapsible casing liner comprising a plurality of walls, a flap conforming substantially in configuration with the cross-sectional interior of said tubular member to serve as the liner bottom for telescopic association with said casing through an open end thereof, confronting extensions on opposing walls, inter-engaging means on certain of said extensions to serve as the top closure of said liner, fold lines connecting a pair of opposing walls to said flap, and fold lines connecting the remaining walls to one of said opposing liner walls, flap extensions formed on the other opposite edges of said liner bottom between said opposing liner walls, said tubular member serving to maintain said liner in rigid folded relation to completely confine contents therein, said remaining walls being partially slitted along its crease line connection with said last mentioned opposing wall to progressively expose the liner contents when displaced from said tubular member.

8. In a container of the character described, the combination with a tubular member open at an end to serve as a casing, of a collapsible casing liner comprising a plurality of walls, a flap conforming substantially in configuration with the cross-sectional interior of said tubular member to serve as the liner bottom for telescopic association with said casing through an open end thereof, confronting extensions on opposing walls, inter-engaging means on certain of said extensions to serve as the top closure of said liner, fold lines connecting a pair of opposing walls to said flap, fold lines connecting the remaining walls to one of said opposing liner walls, flap extensions formed on the other opposite edges of said liner bottom between said opposing liner walls, said tubular member serving to maintain said liner in rigid folded relation to completely confine contents therein, said remaining walls being partially slitted along its crease line connection with said last mentioned opposing wall, and a plurality of longitudinally spaced core lines along said liner walls for reverse folding thereof when displaced from said tubular member to progressively expose the liner contents when displaced from said tubular member.

EDWARD NORMAN SNODGRASS.
MITCHEL E. HOLY.